United States Patent
Bergman et al.

(10) Patent No.: US 9,376,813 B2
(45) Date of Patent: Jun. 28, 2016

(54) CEILING SYSTEM

(71) Applicant: ARMSTRONG WORLD INDUSTRIES, INC., Lancaster, PA (US)

(72) Inventors: Todd M. Bergman, Lititz, PA (US); James R. Waters, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 14/423,839

(22) PCT Filed: Sep. 4, 2013

(86) PCT No.: PCT/US2013/058010
§ 371 (c)(1),
(2) Date: Feb. 25, 2015

(87) PCT Pub. No.: WO2014/039528
PCT Pub. Date: Mar. 13, 2014

(65) Prior Publication Data
US 2015/0300016 A1    Oct. 22, 2015

Related U.S. Application Data

(60) Provisional application No. 61/696,424, filed on Sep. 4, 2012.

(51) Int. Cl.
*E04B 9/22* (2006.01)
*E04B 9/28* (2006.01)
(Continued)

(52) U.S. Cl.
CPC . *E04B 9/241* (2013.01); *E04B 9/04* (2013.01); *E04B 9/0435* (2013.01);
(Continued)

(58) Field of Classification Search
CPC ............ E04B 9/067; E04B 9/22; E04B 9/30; E04B 9/0428; E04B 9/0435; E04B 9/0478; E04B 9/06; E04B 9/225; E04B 9/24; E04B 9/34; E04B 9/36; E04B 9/28; E04B 9/04

USPC ................. 52/506.07, 506.06, 510
See application file for complete search history.

(56) References Cited

U.S. PATENT DOCUMENTS

| 3,710,520 A | * | 1/1973 | Federowicz | ............ E04B 9/003 |
| | | | | 362/149 |
| 4,696,141 A | * | 9/1987 | Nassof | ...................... E04B 9/28 |
| | | | | 52/145 |

(Continued)

FOREIGN PATENT DOCUMENTS

| CN | 2256443 Y | 6/1997 |
| CN | 2727297 Y | 9/2005 |

(Continued)

OTHER PUBLICATIONS

International Search Report and Written Opinion for corresponding PCT/US2013/58010, mailed Dec. 12, 2013. WO.

(Continued)

*Primary Examiner* — Phi A
(74) *Attorney, Agent, or Firm* — Craig M Sterner

(57) ABSTRACT

A ceiling system includes an overhead support grid defining a grid opening and a ceiling die positioned in the opening. The ceiling tile includes a first tegular edge and an opposing second edge, to one embodiment, the second edge may be tegular. The first tegular edge may have a different configuration than the first tegular edge so that the ceiling tile rests in an angled position when mounted in the support grid. When mounted, the bottom surface of the ceiling tile is angled with respect to the support grid. The first tegular edge includes an end surface defining an exposed reveal that is visible below the grid. By selecting various horizontal orientations of multiple ceiling tiles in adjacent grid openings in the ceiling system, different artistic patterns may be created. In one embodiment, the ceiling tile has a substantially uniform thickness.

20 Claims, 21 Drawing Sheets

(51) Int. Cl.
*E04B 9/06* (2006.01)
*E04B 9/04* (2006.01)
*E04B 9/24* (2006.01)
*E04B 9/26* (2006.01)
*F16B 2/24* (2006.01)
*F16B 5/12* (2006.01)
*E04B 9/36* (2006.01)

(52) U.S. Cl.
CPC .............. *E04B 9/0464* (2013.01); *E04B 9/225* (2013.01); *E04B 9/26* (2013.01); *F16B 2/243* (2013.01); *F16B 5/125* (2013.01); *E04B 9/064* (2013.01); *E04B 9/067* (2013.01); *E04B 9/36* (2013.01)

(56) References Cited

U.S. PATENT DOCUMENTS

| | | | | |
|---|---|---|---|---|
| 5,050,360 | A * | 9/1991 | Gailey | 52/506.06 |
| 5,265,393 | A * | 11/1993 | Bischel et al. | 52/461 |
| 6,029,413 | A * | 2/2000 | Compas, Jr. | 52/506.06 |
| 6,782,670 | B2 | 8/2004 | Wendt | |
| 6,807,785 | B2 * | 10/2004 | Lynch et al. | 52/506.06 |
| 6,892,500 | B2 * | 5/2005 | Zaborowski | 52/506.06 |
| 7,017,317 | B2 * | 3/2006 | Capozzo | 52/506.07 |
| 7,658,046 | B2 * | 2/2010 | Lynch et al. | 52/506.07 |
| 8,745,947 | B2 * | 6/2014 | Jahn et al. | 52/506.07 |
| 2002/0157339 | A1 * | 10/2002 | Repasky | 52/506.06 |
| 2003/0121227 | A1 | 7/2003 | Wendt | |
| 2007/0028545 | A1 * | 2/2007 | Schreuder et al. | 52/506.07 |
| 2008/0148665 | A1 * | 6/2008 | Yonash et al. | 52/384 |
| 2011/0265393 | A1 * | 11/2011 | Mass et al. | 52/39 |
| 2013/0160386 | A1 * | 6/2013 | Gulbrandsen | 52/506.06 |

FOREIGN PATENT DOCUMENTS

| | | |
|---|---|---|
| CN | 201351320 Y | 11/2009 |
| CN | 101918653 A | 12/2010 |
| EP | 0979908 | 2/2000 |
| EP | 2662504 | 11/2013 |

OTHER PUBLICATIONS

International Search Report for corresponding CN Application No. 2013800460329, mailed Jan. 4, 2016. CN.

* cited by examiner

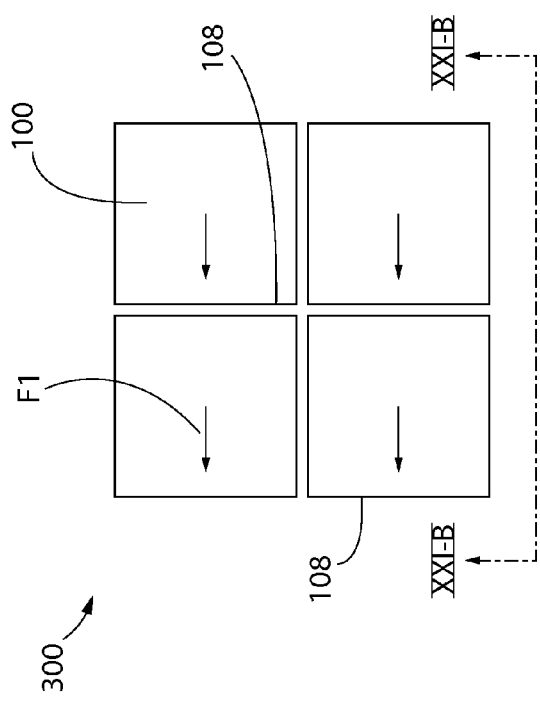
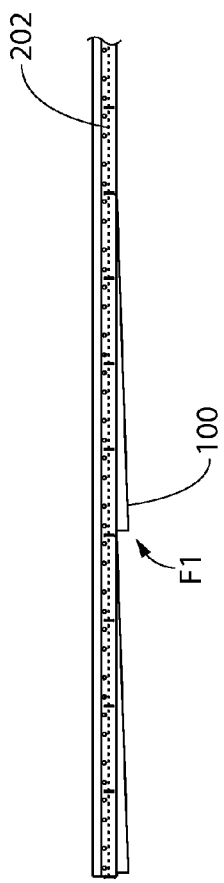
FIG. 21A
FIG. 21B

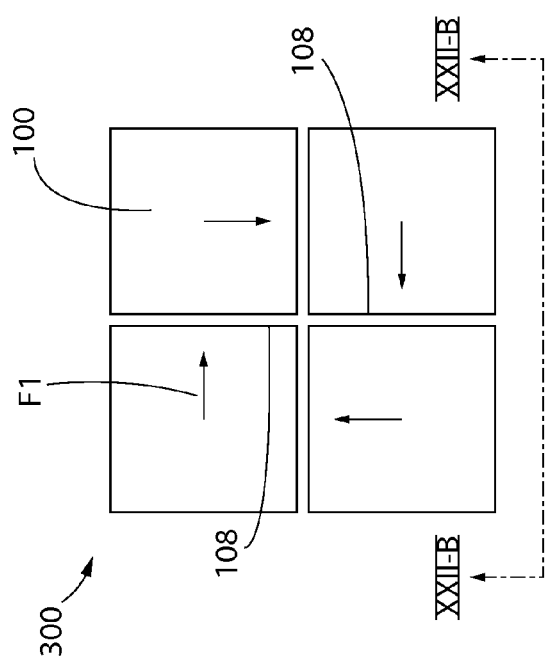
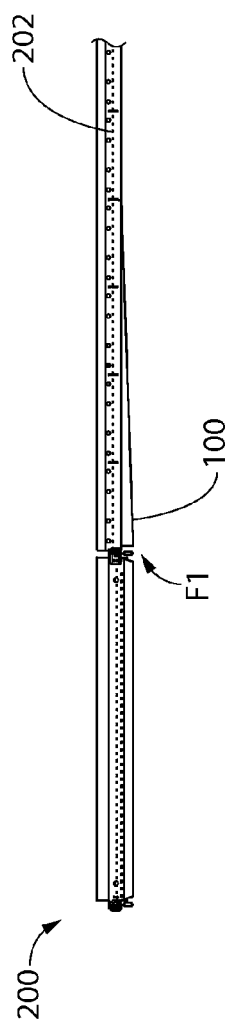
FIG. 22A
FIG. 22B

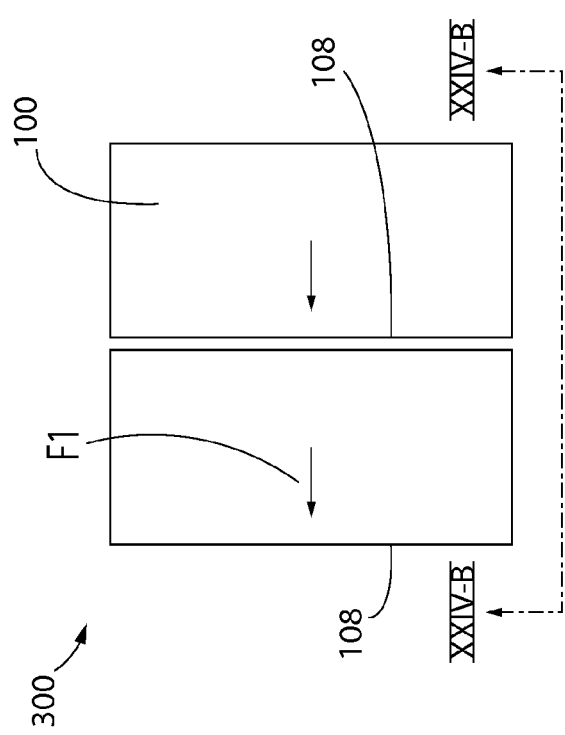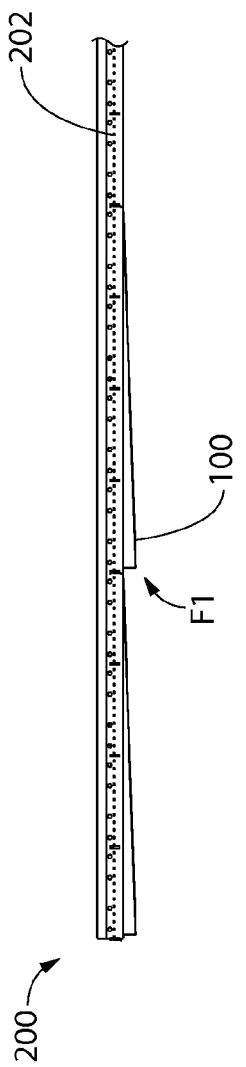

CEILING SYSTEM

CROSS-REFERENCE TO RELATED APPLICATIONS

The present application is a U.S. National Stage application under 35 U.S.C. §371 of PCT Application No. PCT/US2013/058010, filed Sep. 4, 2013, which in turn claims the benefit of U.S. Provisional Application Serial No. 61/696,424, filed Sep. 4, 2012, the entirety of which is incorporated by reference.

FIELD OF THE INVENTION

The present invention relates to ceiling systems, and more particularly to a monolithic ceiling system formed with tiles.

BACKGROUND OF THE INVENTION

One type of ceiling system includes individual ceiling tiles which are installed in a suspended overhead support grid to collectively form a monolithic ceiling in appearance. The grid generally comprises an array of horizontal interlocking grid support members which may typically be arranged in a rectilinear pattern forming openings sized to locate and receive a portion of the tiles therein for attachment to the grid. The ceiling tiles are generally supported at their perimeter by the grid when fully mounted.

Variations in the aesthetic appearance of the ceiling system are desirable for creating customized designs.

SUMMARY OF THE INVENTION

The present invention provides a ceiling system which allows customized creation of user-selectable three-dimensional visual effects based on the mounting positions (e.g. horizontal orientation) of the individual ceiling tiles. The ceiling tiles may be configured with at least two opposing rebated peripheral sides having tegular edges configured for mounting to an overhead support grid. One embodiment includes a flush tegular edge when mounted and an opposing deep recessed tegular edge which creates a reveal that projects downward below the support grid. The bottom surface of the ceiling tile may therefore be angled and lie in different horizontal planes when mounted to the grid.

In various arrangements, the ceiling tile and mounting system allows creation of undulating ceiling configurations such as without limitation a facetted hill and valley, pinwheel, shingled effect, combinations thereof, and others via detachably mounting the ceiling tiles to the grid support members in different horizontal positions or orientations. In addition, the original visual appearance of the ceiling system may be readily changed later if desired by simply changing the mounting position of some or all of the ceiling tiles in the grid.

According to one exemplary embodiment, a ceiling system includes an overhead support grid defining a grid opening configured for locating a ceiling tile therein, and a ceiling tile positioned in the grid opening. The ceiling tile has a top surface, a bottom surface, a first tegular edge engaging the support grid, and an opposing second tegular edge engaging the support grid. The first tegular edge has a configuration different than the second tegular edge. In one preferred embodiment, the ceiling tile has a substantially uniform thickness between the first and second tegular edges wherein the top and bottom surfaces of the ceiling tile are substantially parallel. In one embodiment, the first tegular edge has a deep recess and the second tegular edge has a shallow recess, and may be a flush recess for locating the bottom surface of the ceiling tile in a substantially flush position with respect to the bottom of the support grid. The first tegular edge therefore sits lower in the support grid than the second tegular edge. When mounted in the support grid, the ceiling tile is seated in an angled position.

According to another embodiment, a ceiling system includes an overhead support grid comprising intersecting grid support members defining a grid opening configured for locating a ceiling tile therein, and a ceiling tile positioned in the grid opening, the ceiling tile having a top surface and a bottom surface oriented parallel to the top surface. The ceiling tile has a first peripheral side defining a downward facing first support surface engaging one of the grid support members and an opposing second peripheral side defining a downward facing second support surface engaging a second grid support members. The first and second support surfaces are configured so that the ceiling tile is angled in orientation with respect to a horizontal reference plane defined by the grid support members when the ceiling tile is mounted in the support grid. In one embodiment, the ceiling tile has a substantially uniform thickness between the first and second peripheral sides.

According to another embodiment, a customizable ceiling system is provided. The ceiling system includes an overhead support grid comprising intersecting grid support members defining a plurality of grid openings configured for locating ceiling tiles therein, and a plurality of ceiling tiles each positioned in one of the grid openings. The ceiling tiles have a top surface and a bottom surface oriented parallel to the top surface. The ceiling tiles each have a first peripheral side defining a downward facing first support surface engaging one of the grid support members and an opposing second peripheral side defining a downward facing second support surface engaging a second grid support members. The first and second support surfaces of each ceiling tile are configured so that the ceiling tile is angled in orientation with respect to a horizontal reference plane defined by the grid support members when the ceiling tiles are mounted in the support grid. The first peripheral side of each ceiling tile defines an outward facing end surface extending downwards below the support grid and creating an exposed visible reveal.

BRIEF DESCRIPTION OF THE DRAWINGS

The features of the exemplary embodiments of the present invention will be described with reference to the following drawings, where like elements are labeled similarly, and in which:

FIGS. 21A-24B each illustrate a bottom plan view and corresponding side elevation views of several exemplary ceiling tiles and mounted pattern configurations which may be created with a ceiling system according to the present disclosure.

Figure 1:
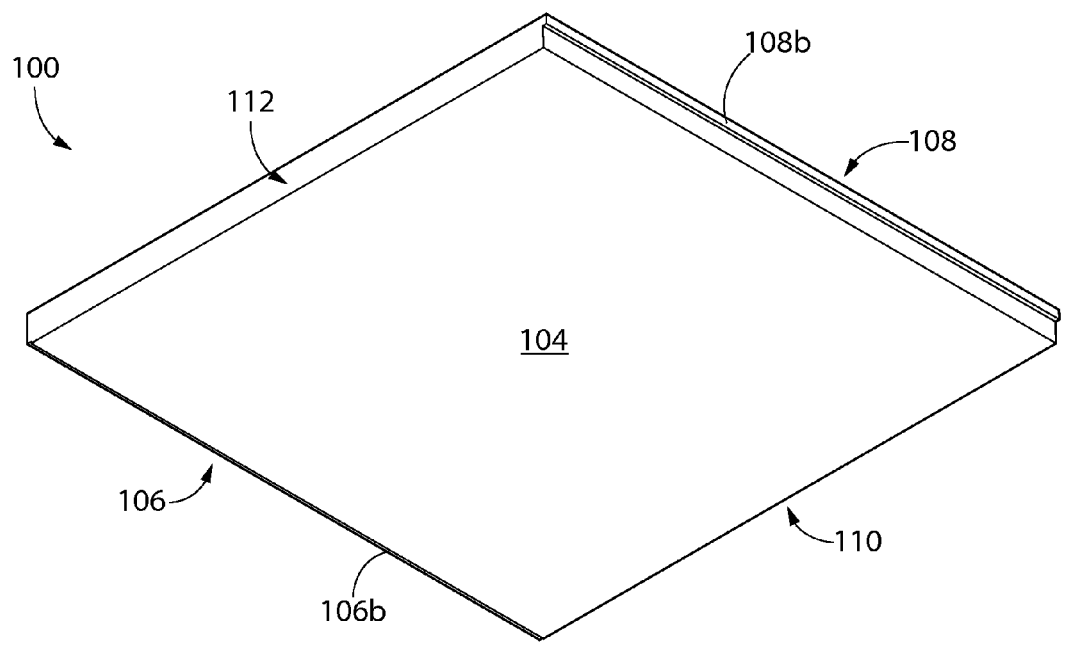
FIG. 1 is a perspective view of a ceiling tile for use in a ceiling system according to the present disclosure.
Figure 2:
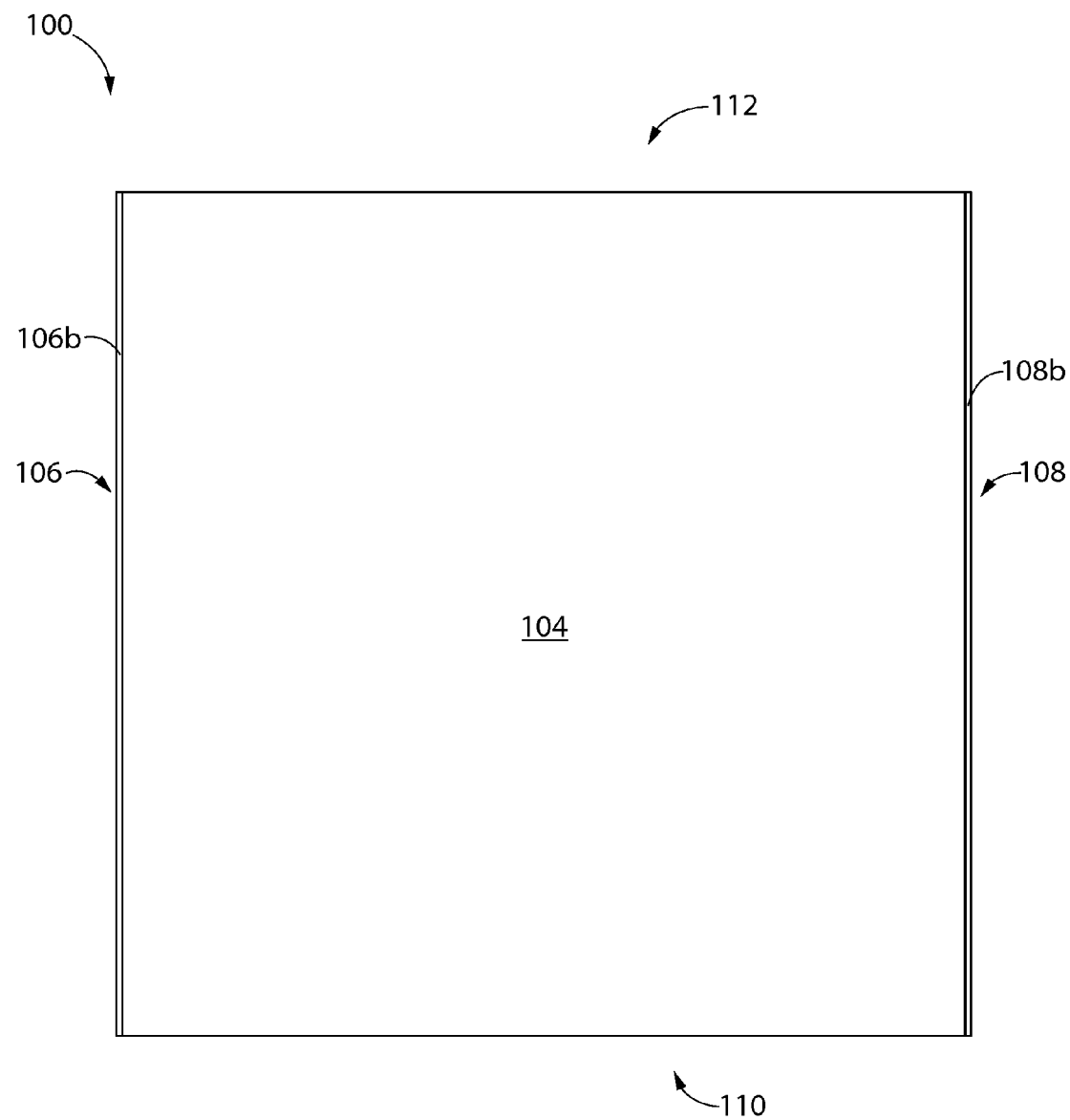
FIG. 2 is a bottom plan view thereof.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

FIGS. 1-6 depict an exemplary ceiling tile 100 according to one embodiment of the present disclosure. Ceiling tiles 100 are configured for mounting in openings of an overhead support grid 200, as further described herein. The ceiling tiles 100 and support grid 200 collectively define a ceiling system 300 having the ability to produce different three-dimensional visual effects by varying the position of the ceiling tiles.

Ceiling tile 100 includes an upper surface 102, lower surface 104, and four peripheral sides 106, 108, 110, and 112. Peripheral sides 106 and 108 are opposing and may each define a tegular edge in profile in one non-limiting embodiment. Peripheral side 106 includes a downward facing offset support surface 106a formed on laterally-extending back flange 106b that is configured to engage a mating upward facing support surface 204 defined on overhead support grid 200 (see, e.g. FIG. 20). Support surface 106a is defined by recess 107 in side 106 and is offset from the bottom surface 104 of ceiling tile 100 by a vertical distance V2. It will be appreciated that distance V2 also defines the vertical depth of the recess 107. Recess 107 defines a laterally outward facing end surface F2 on side 106 of ceiling tile 100 within the recess. The end surface F2 (lower portion of surface 106 within recess 107) may be offset horizontally from the upper portion of surface 106 above the recess by a horizontal distance H2. In one embodiment, the top of end surface F2 may be angled inwards towards the center of the ceiling tile 100. Support surface 106a is oriented substantially parallel to bottom surface 104 of ceiling tile 100 in one embodiment.

Figure 20:
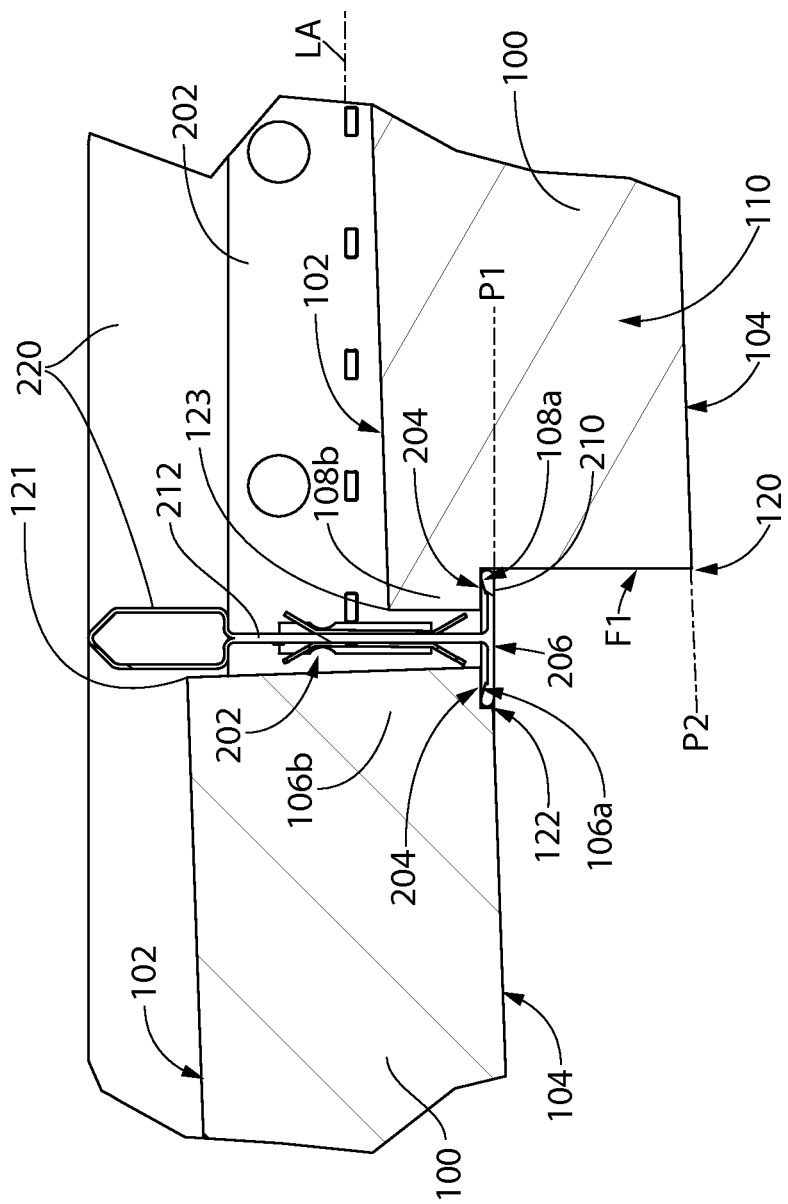
FIG. 20 is an enlarged detail XX taken from FIG. 19.

Opposing peripheral side 108 includes a downward facing offset support surface 108a formed on laterally-extending back flange 108b that is configured to engage a mating upward facing support surface 204 defined on overhead support grid 200 (see, e.g. FIG. 20). Support surface 108a is defined by recess 109 in side 108 and is offset from the bottom surface 104 of ceiling tile 100 by a vertical distance V1. It will be appreciated that distance V1 also defines the vertical depth of the recess 109. Recess 109 defines a laterally outward facing end surface F1 on side 108 of ceiling tile 100 within the recess. The end surface F1 (lower portion of surface 108 within recess 109) may be offset horizontally from the upper portion of surface 108 above the recess by a horizontal distance H1. In one embodiment, the top of end surface F1 may be angled inwards towards the center of the ceiling tile 100. Support surface 108a is oriented substantially parallel to bottom surface 104 of ceiling tile 100 in one embodiment.

The tegular edges of peripheral sides 106 and 108 may be different in configuration to create a three-dimensional visual effect when mounted in the overhead support grid 200 of the ceiling system 300. Accordingly, in one embodiment, recess 109 in peripheral side 108 may be deeper (higher) than recess 107 in peripheral side 106 by making vertical distance V1 larger than vertical distance V2 measured to the offset support surfaces 108a and 106a, respectively. Outward facing end surface F1 within recess 109 will therefore have a greater height and exposed surface area below the overhead support grid 200 than end surface F2 within recess 107. When mounted in overhead support grid 200 (as shown in FIGS. 13-14 and 17-19), the top and bottom surfaces 102, 104 of the ceiling tiles 100 will be angled in orientation (and appearance) with respect to the grid support members 202 due to the difference in recess depths (heights) in peripheral sides 106 and 108.

With continuing reference to FIGS. 1-6, in one embodiment the remaining opposing peripheral sides 110 and 112 may have plain or straight edge profiles without any offset support surfaces or recesses. With these edge configurations, the ceiling tiles 100 preferably have a horizontal width measured between sides 110 and 112 that is dimensioned to fit in between opposing grid support members 202 (see, e.g. FIGS. 17-20) without engaging upward facing support surface 204 of the grid support members. Sides 110 and 112 therefore do not engage grid support members 202. The ceiling tile 100 is supported within the overhead support grid by the tegular edges on opposing peripheral sides 106 and 108. This tile configuration may be used for field tiles (i.e. those not lying along the perimeter of ceiling system 300.

FIGS. 7-12 show an alternative embodiment of ceiling tile 100 that may be useful for border tiles in which either tegular edge on peripheral sides 106 or 108 may need to be cut or severed by an installer to reduce the width of the tile. This would produce an essentially straight side without a tegular edge that does not engage the overhead support grid 200. In this embodiment, the remaining opposing peripheral sides 110 and 112 of ceiling tile 100 are also configured with tegular edges. Sides 110 and 112 each include an angled downward facing offset support surface 110a and 112a formed on laterally-extending back flanges 110b and 112b, respectively. Support surfaces 110a and 112a are defined by recesses 111 and 113 respectively in peripheral sides 110 and 112, and may each be offset from the bottom surface 104 of ceiling tile 100 by a varying vertical distance V3 between sides 106 and 108. Support surfaces 110a, 112a are oriented at an angle A1 between 0 and 45 degrees to bottom surface 104 of ceiling tile 100 (thereby producing the varying distance V3). In one embodiment representative example, without limitation, angle A1 may be about 3-5 degrees.

Support surfaces 110a, 112a each intersect downward facing offset support surfaces 106a and 110a such that a continuous rectilinear-shaped peripheral downward facing support surface is formed around all sides of the ceiling tile 100 for engaging the overhead support grid 200, as further described herein. This embodiment provides support of the ceiling tile 100 on all sides when hung in full-sized grid openings 208 of support grid 200. Even if either peripheral side 106 or 108 needs to be field trimmed to fit a reduced size grid opening 208, the ceiling tile 100 will still be adequately supported on three remaining peripheral sides by the support surfaces on the back flanges.

When ceiling tiles 100 are mounted in the overhead support grid 200, exposed outward facing end surfaces F3, F4 of peripheral sides 110, 112 within recesses 111, 113 lying below support surfaces 110a, 112a create opposing angled vertical reveals visible to room occupants. The angled end surface F3, F4 reveals are highest adjacent peripheral side 108 and narrow approaching peripheral side 106 (see also FIG. 14).

Figure 3:
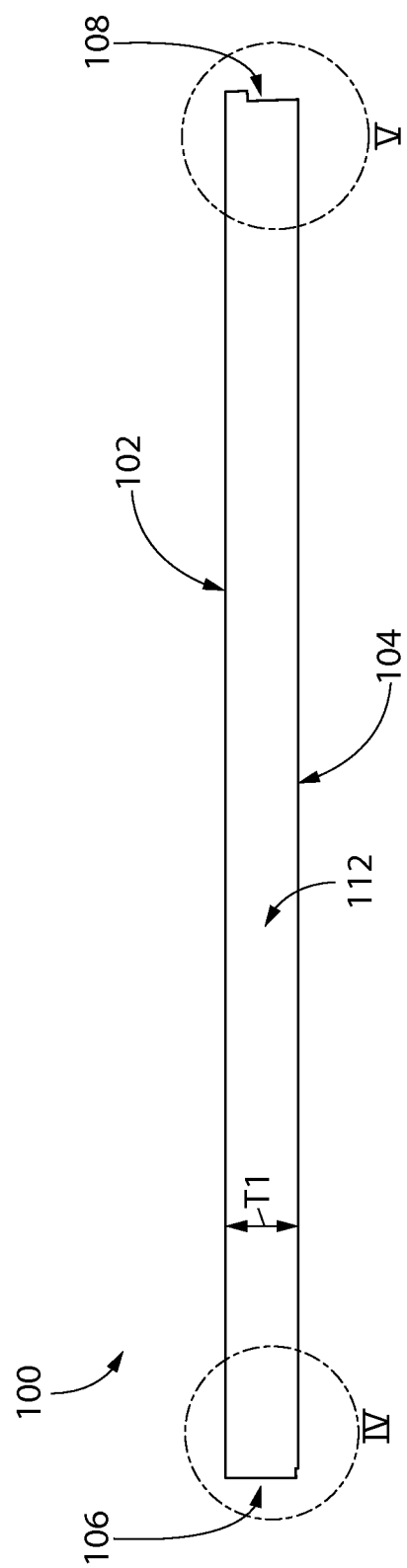
FIG. 3 is a first side elevation view thereof, the view taken from a first orthogonal direction.
Figure 4:
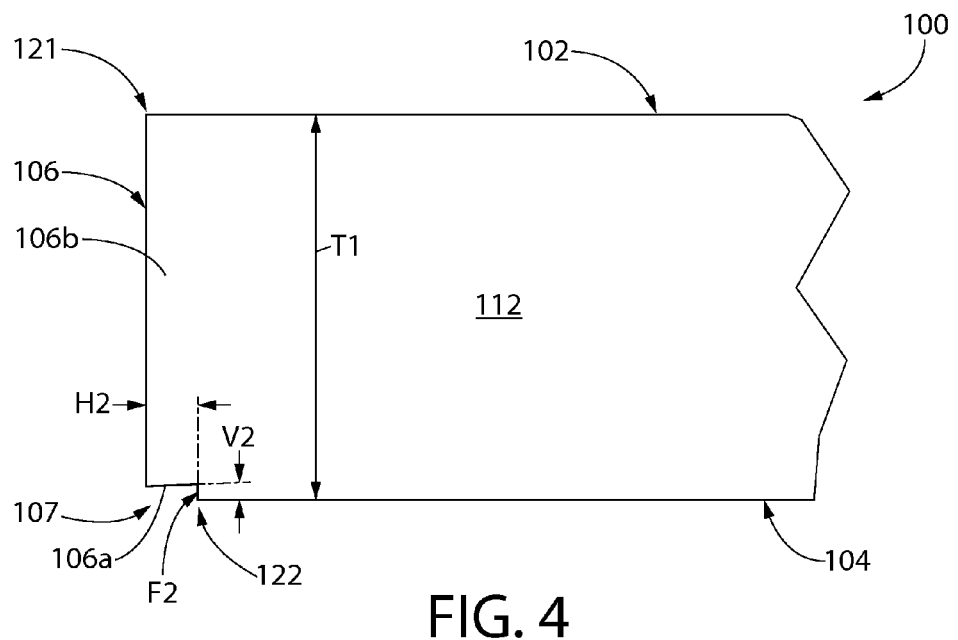
FIG. 4 is an enlarged detail IV from FIG. 3.
Figure 5:
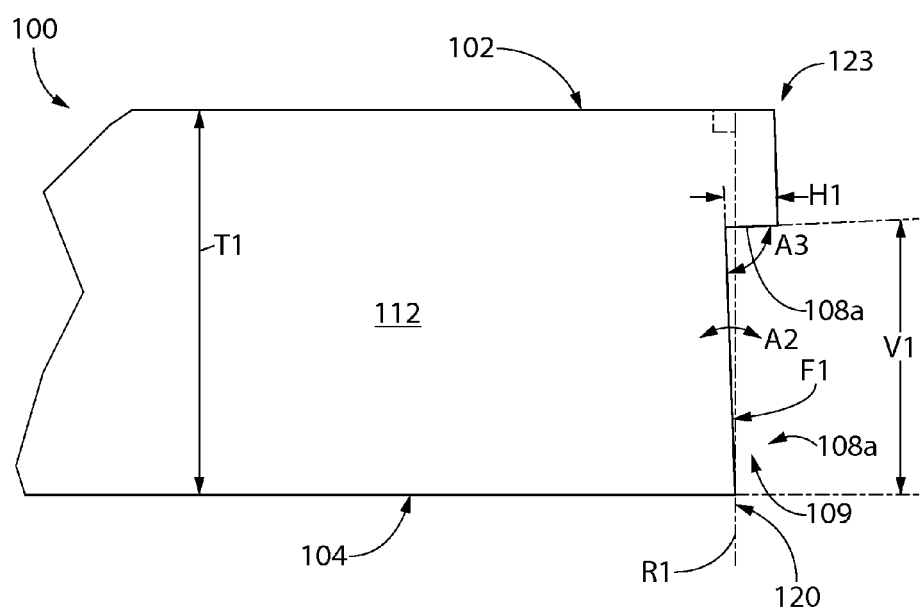
FIG. 5 is an enlarged detail V from FIG. 3.
Figure 6:
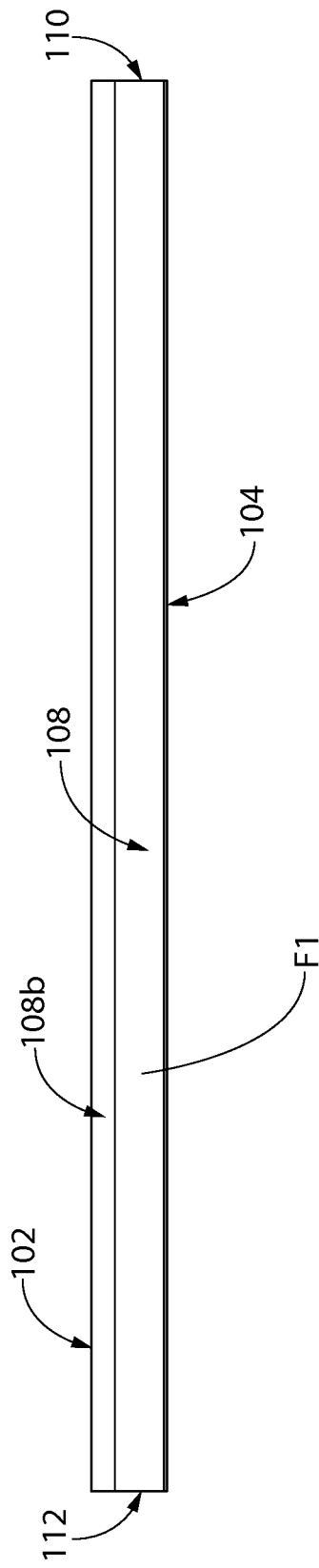
FIG. 6 is a second side elevation view of the ceiling tile of FIG. 1, the view taken from a second orthogonal direction.
Figure 7:
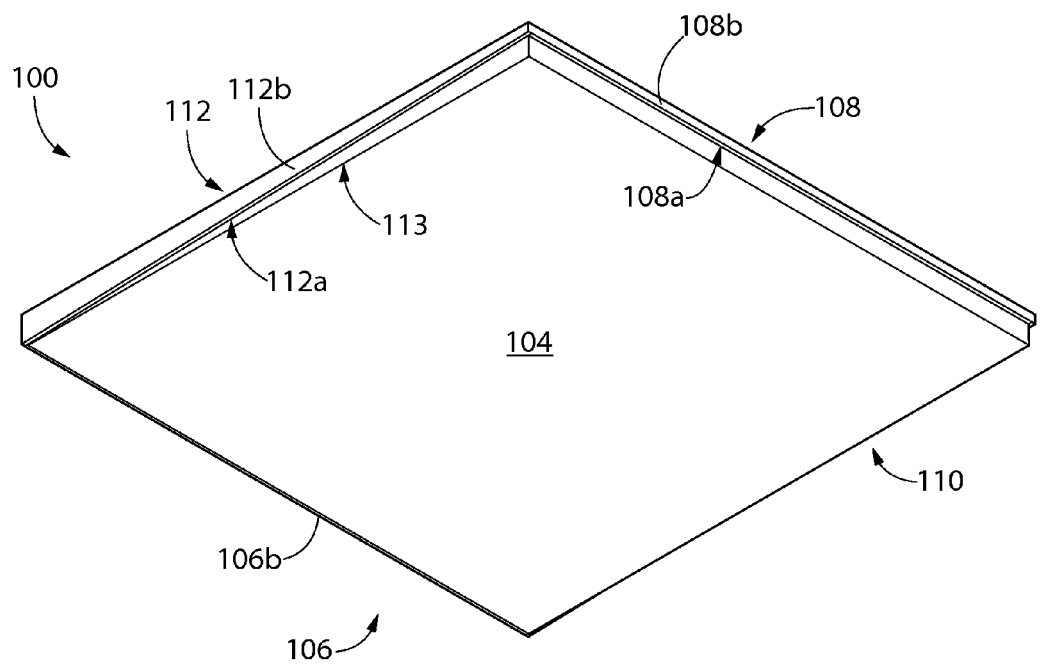
FIG. 7 is a perspective view of an alternative embodiment of ceiling tile for use in a ceiling system according to the present disclosure.
Figure 8:
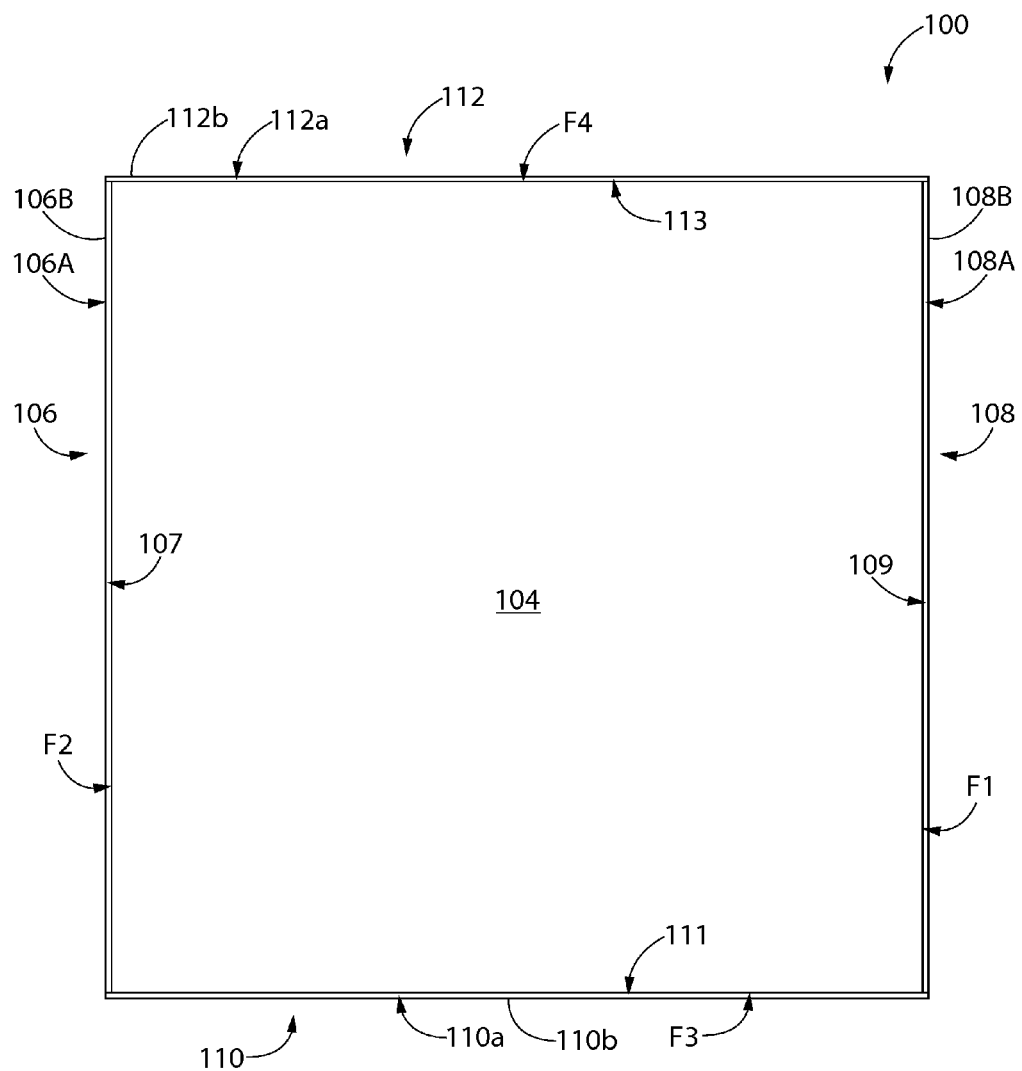
FIG. 8 is a bottom plan view thereof.
Figure 9:
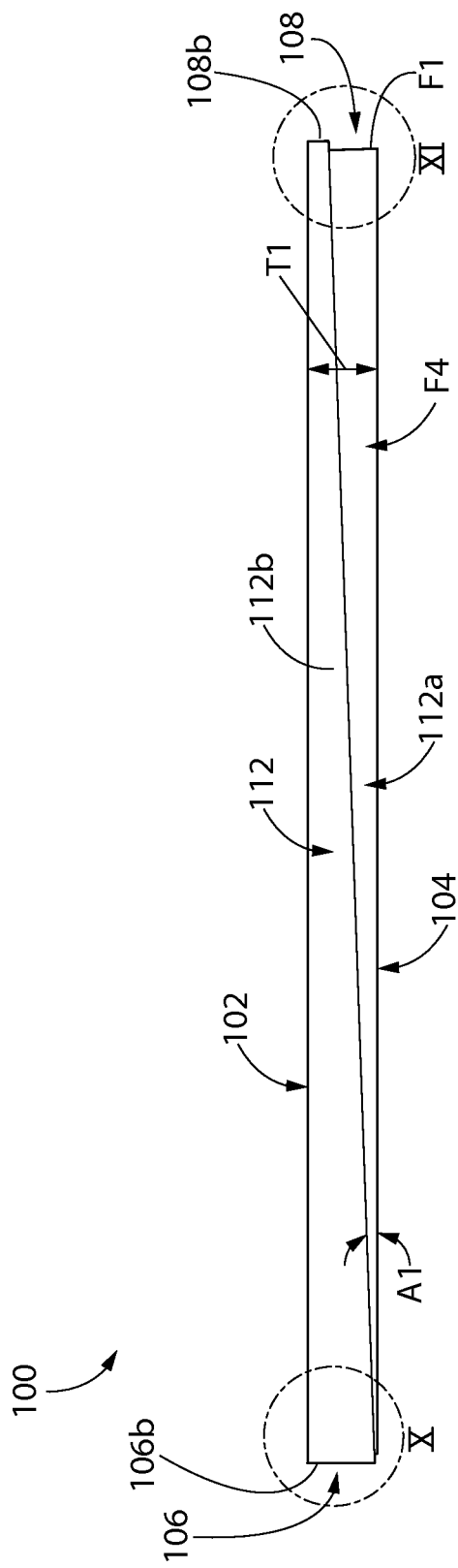
FIG. 9 is a first side elevation view thereof, the view taken from a first orthogonal direction.
Figure 10:
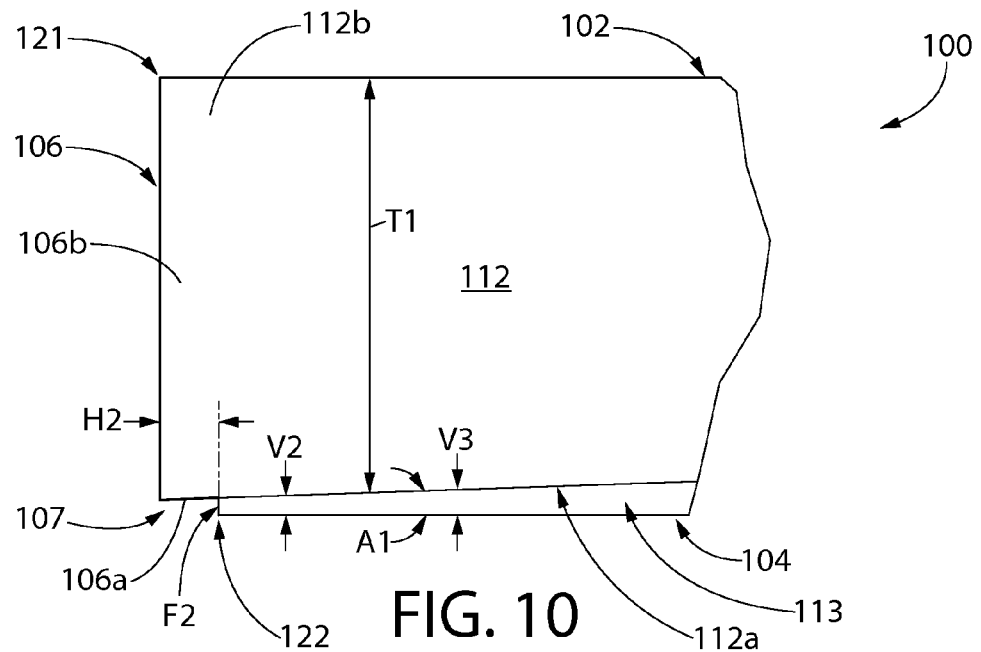
FIG. 10 is an enlarged detail X from FIG. 9.
Figure 11:
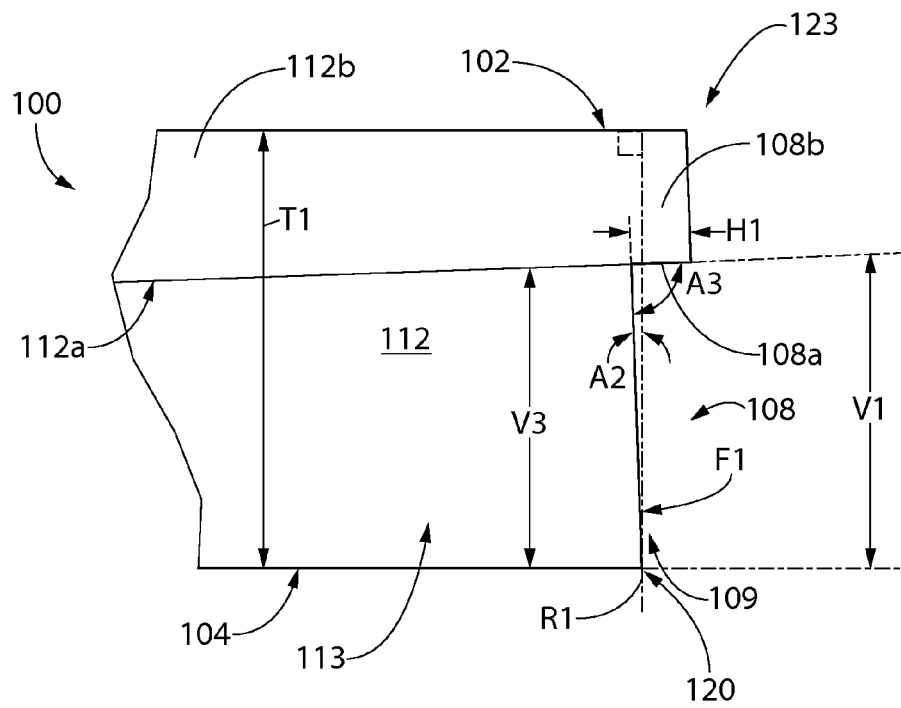
FIG. 11 is an enlarged detail XI from FIG. 9.
Figure 12:
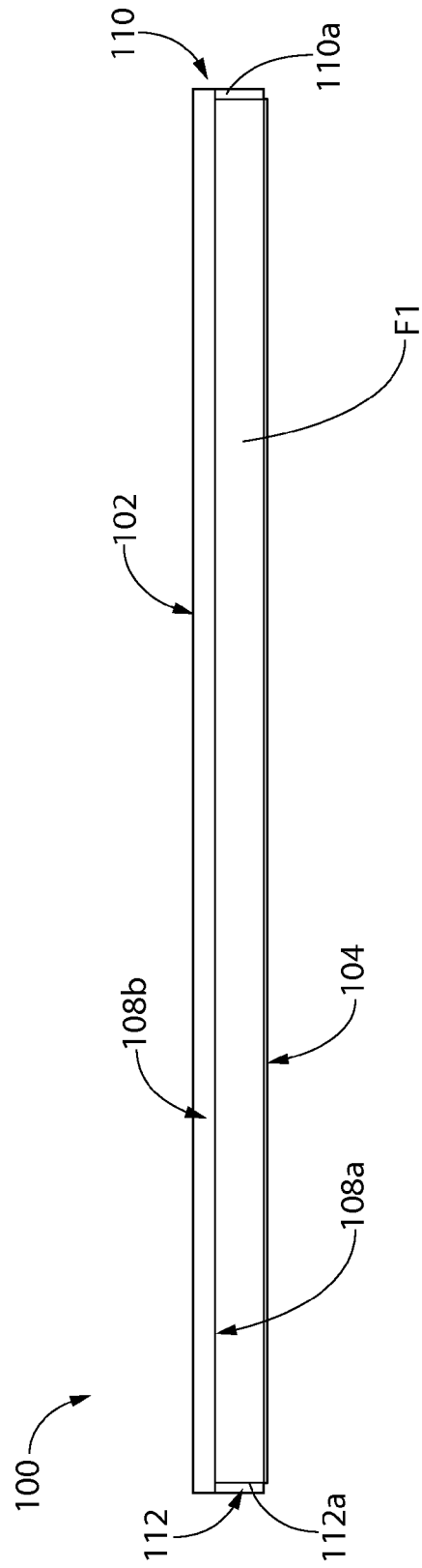
FIG. 12 is a second side elevation view of the ceiling tile of FIG. 7, the view taken from a second orthogonal direction.
Figure 13:
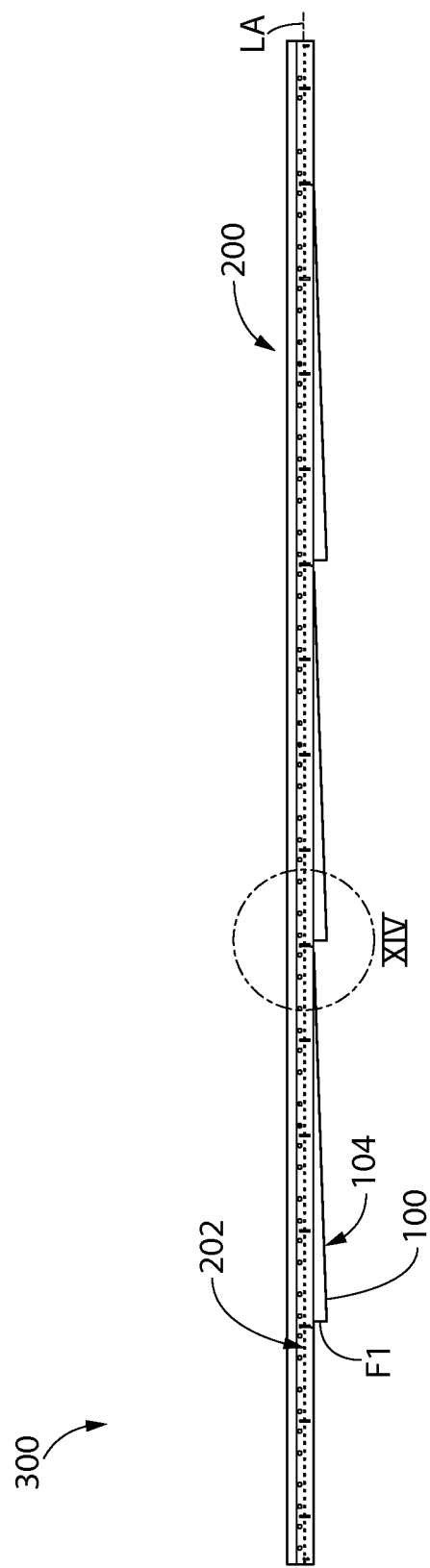
FIG. 13 is a first side elevation view of a ceiling system comprising an overhead support grid and ceiling tiles of either FIG. 1 or 7, the view taken from a first orthogonal direction.

In one embodiment, the ceiling tiles 100 may have a substantially uniform overall thickness T1 as shown in FIGS. 3-5 between peripheral sides 106 and 108, and further between peripheral sides 110 and 112. Accordingly, top surface 102 is substantially parallel to bottom surface 104 of the ceiling tile 100. The angled orientation and appearance of the bottom surfaces 104 of the ceiling tiles 100 (and formation of a reveal on end surface F1 on peripheral side 108 as described further below) is achieved through the different recess depths or heights (i.e. vertical distances V2 and V1) in the tegular edges of peripheral sides 106 and 108 instead of varying the thickness of the ceiling tiles at different spots which would increase the weight of the tiles and be more costly to produce. Advantageously, this further minimizes the total installed weight of the ceiling tiles that must be supported by the overhead support grid 200 thereby saving money by allowing structurally lighter grid support members to be provided.

When ceiling tile 100 is fully mounted in an angled position to support grid 200, the reveal is created on peripheral side 108 by the projection of end surface F1 below the bottom 206 of the grid support members 202. The reveal is visible to room occupants within the space below the ceiling system 300 (see, e.g. FIGS. 13-14 and 18-20) and creates a vertical rectangular face projecting below the support grid when viewed head on (i.e. perpendicular to peripheral side 108.

To maintain the position of the end surface F1 reveal in a substantially vertical plane as viewed by the room occupants when using ceiling tiles 100 of uniform thickness T1 as described above, the end surface F1 preferably is disposed at an angle A2 with respect to the top surface 102 of the ceiling tile 100 as shown in FIG. 5. Because top and bottom surfaces 102, 104 are parallel to each other, end surface F1 is therefore also disposed at an angle to the bottom surface of the ceiling tile. Angle A2 is measured between a vertical reference line RI which lies perpendicular to top surface 102 (i.e. 90 degrees thereto) and the plane of the end surface F1. In some exemplary embodiments, angle A2 may be between 0 degrees and 45 degrees depending on the vertical depth of the recess 109) (i.e. vertical distance V1), with deeper recesses requiring generally larger angles A2 to maintain the end surface F1 reveal in a substantially vertical plane. In one embodiment representative example, without limitation, angle A2 may be about 3-5 degrees. To further produce the vertically oriented end surface F1 reveal, the angle A3 measured between end surface F1 and downward facing support surface 108a on peripheral side 108 of ceiling tile 100 is preferably at a 90 degree angle A3 (i.e. perpendicular). Downward facing support surface 108a would therefore not be parallel to top and bottom surfaces 102 and 104.

End surface F2 on opposing peripheral side 106 may be angled similarly to end surface F1 described above, or in other embodiments may be vertically straight (i.e. perpendicular to top and bottom surfaces 102 and 104 of ceiling tile 100 depending on the vertical depth (i.e. vertical distance V2) of recess 107. For small vertical depths, as illustrated in FIG. 4, a straight end surface F2 may be used as there may be no reveal or a minimal reveal which would not be noticeable to a room occupant. In one embodiment, a straight end surface F2 is used.

Ceiling tiles 100 may be made of any suitable material, including for example without limitation fiberglass, a mineral fiber substrate, wood, or other materials and various combinations of materials. The ceiling tiles 100 may further be structured to be pliable or non-pliable in various embodiments. Accordingly, the invention is not limited by the selection of ceiling tile material or construction.

FIGS. 13-20 depict the overhead support grid 200 for perimeter mounting and hanging the ceiling tiles 100 in ceiling system 300. Support grid 200 includes a plurality of intersecting and elongated grid support members 202 forming an array of grid openings 208 configured and dimensioned to receive ceiling tiles 100 therein. In some embodiments, the grid support members 202 may be arranged in an orthogonal pattern forming rectilinear grid openings 208 such as squares or rectangles for ceiling tiles 100 having complementary configured shapes (in top plan view). The terminal ends of at least some of the grid support members 202 may be configured to interlock with other transversely oriented grid support members 202 at right angles to form the rectilinear grid pattern in a manner well known to those skilled in the art without further elaboration. Any suitable interlocking mechanism and configuration may be used.

In transverse cross section, grid support members 202 may have a generally inverted T-shaped configuration when in the mounted position suspended from a ceiling structure or other overhead support structure. In this embodiment, grid support members 202 may include a longitudinally-extending horizontal bottom flange 210, a bulbous top stiffening channel 220, and a vertical web 212 extending upwards from the flange to the stiffener. The grid support members 202 each define a longitudinal axis LA. Web 212 may be centered between opposing side ends of flange 212 in one embodiment. This defines a pair of upward facing support surfaces 204 on each side of the web for seating a portion of a ceiling tile edge thereon, such as downward facing offset support surfaces 106a, 108a, 110a, and/or 112a (see FIGS. 4-5 and 7-12). Bottom flange 210 further defines a bottom surface 206 facing downwards towards a room or space below the support grid. Bottom surface 206 may be generally disposed opposite support surfaces 204 on the flange. Bottom surface 206 defines a first horizontal reference plane P1 of the overhead support grid 200. In one embodiment, the bottom surfaces 206 of at least four intersecting grid support members 202 defining a grid opening 208 in which a ceiling tile 100 is mounted all lie in the same horizontal reference plane P1. Accordingly, these four intersecting bottom surfaces 206 are positioned at essentially the same elevation.

Although the exemplary embodiment of grid support member 202 has an inverted T-shaped cross sectional configuration, it will be appreciated that other suitable cross sectional configurations may be used so long as an upward facing support surface 204 is provided on at least some grid support members 202 for holding ceiling tiles 100.

Grid support members 202 may be supported from and suspended below a ceiling 216 or other overhead support structure (e.g. beam, deck, etc.) by vertical hangers 214 having any suitable configuration including for example without limitation wires, cables, rods, struts, etc. Hangers 214 may be attached at one end to the ceiling 216 or other overhead structure by appropriate mounting components (e.g. expansion or anchor lugs, welding, clamps, brackets, etc.) and at an opposite end to the support members 202 by any suitable method (e.g. fasteners, brackets, clamped, threaded rods, etc.). Hangers 214 may be spaced along the length of the grid support members 202 at appropriate intervals to properly support the weight of the ceiling tiles 100. Therefore, any suitable number and spacing of hangers 214 may be used.

Grid support members 202 may be made of metallic or non-metallic material suitable to hold the intended dead or weight load of ceiling tiles 100 without undue deflection. In some preferred but non-limiting embodiments, support members 110 may be made of metal including aluminum, titanium, steel, or other.

Figure 16:
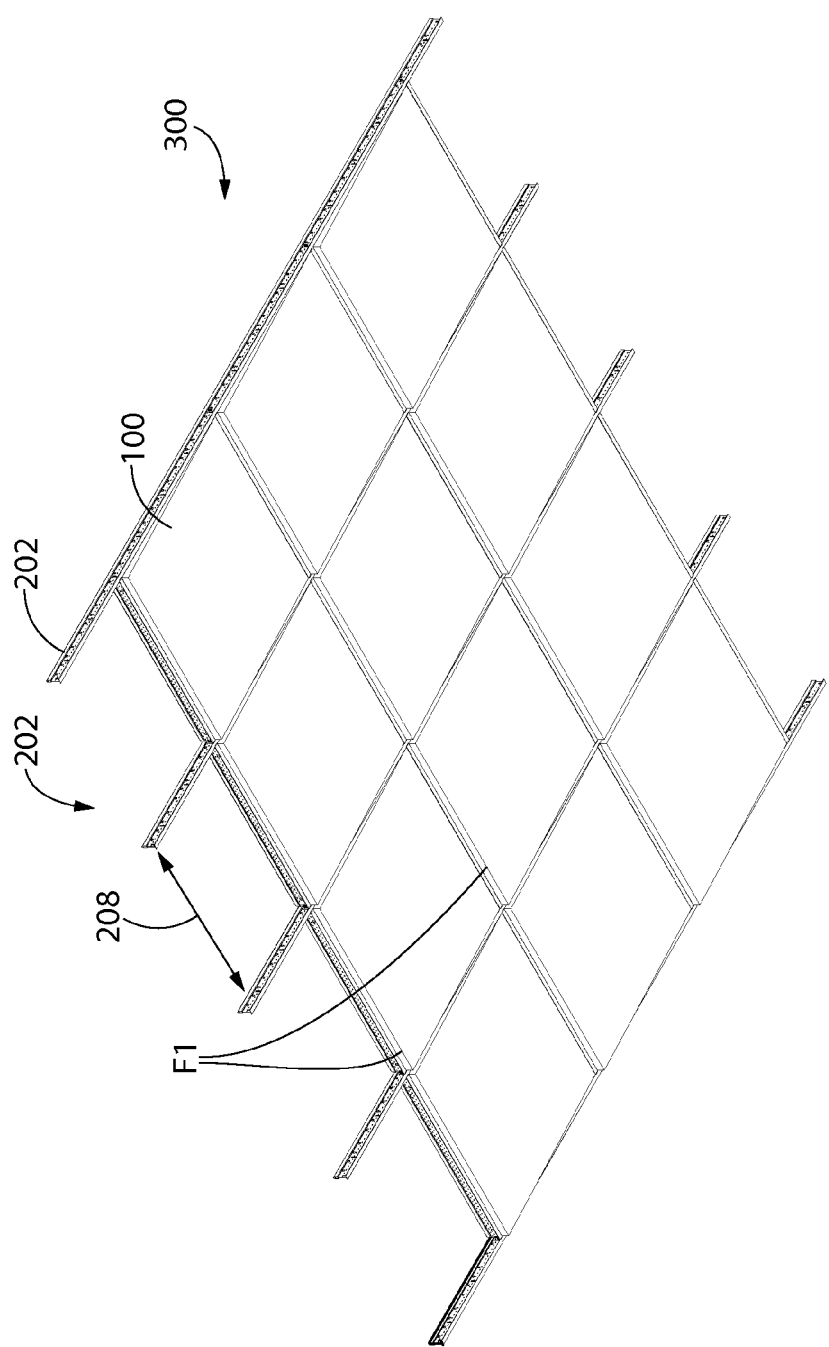
FIG. 16 is a perspective view of ceiling system of FIG. 13 viewed from beneath the ceiling tiles.
Figure 17:
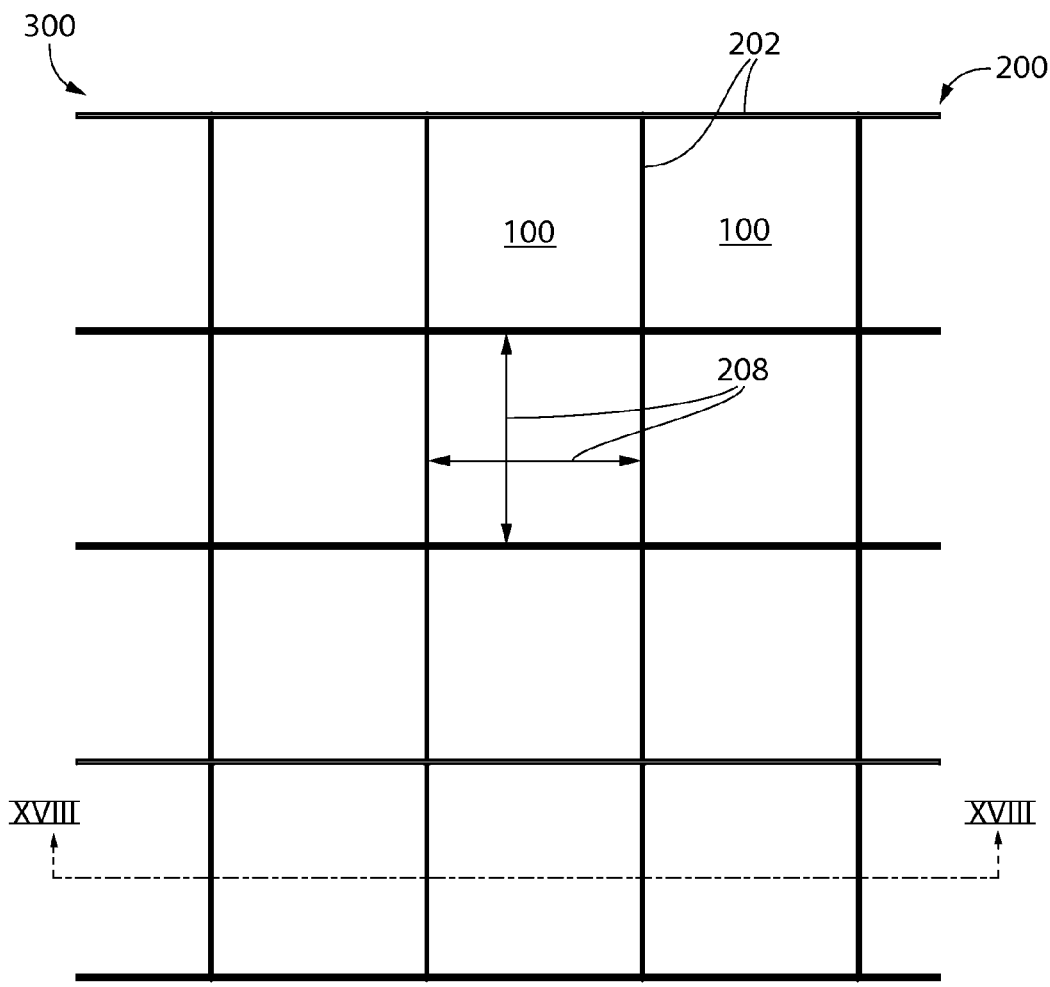
FIG. 17 is a bottom plan view thereof.
Figure 18:
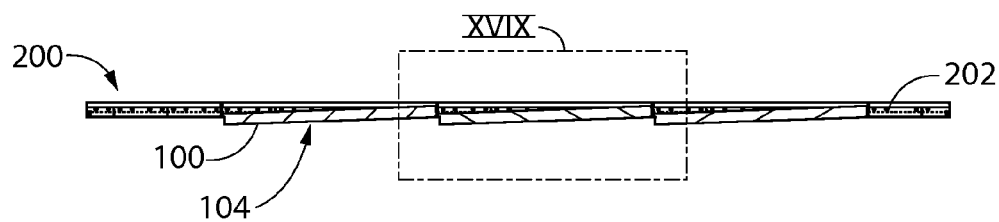
FIG. 18 a cross-sectional side view taken along lines XVIII-XVIII in FIG. 17.

Mounting of the ceiling tiles 100 to overhead support grid 200 will now be described in further detail. FIGS. 16 and 17 show a complete ceiling system 300 with ceiling tiles 100 in a fully mounted position supported by the overhead support grid 200. FIGS. 13-15 and 18-20 show various side elevation and cross-sectional views of the ceiling system with mounting details of the ceiling tiles 100 in overhead support grid 200. The end surface F1 reveals are visible projecting below from the grid support members 202.

Referring to the FIGS. 13-20, the tegular edges of peripheral sides 106 and 108 are shown engaged with grid support members 202 to support the ceiling tiles 100 on at least two opposing sides. The downward facing offset support surfaces 106a and 108a formed on laterally-extending back flanges 106b and 108b of ceiling tile 100, respectively, are seated on mating upward facing support surfaces 204 of the grid support members.

Figure 14:
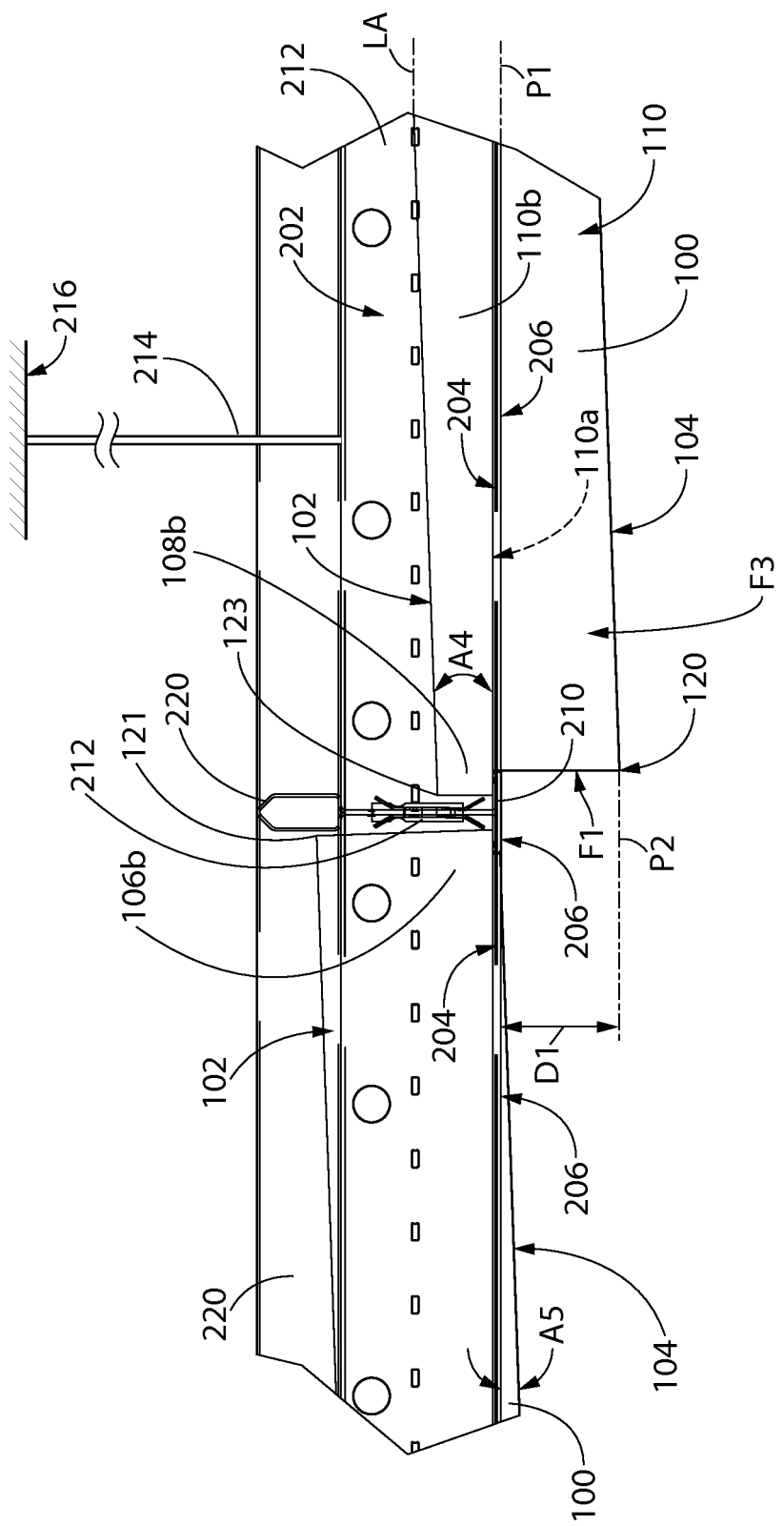
FIG. 14 is an enlarged detail XIV taken from FIG. 13.
Figure 15:
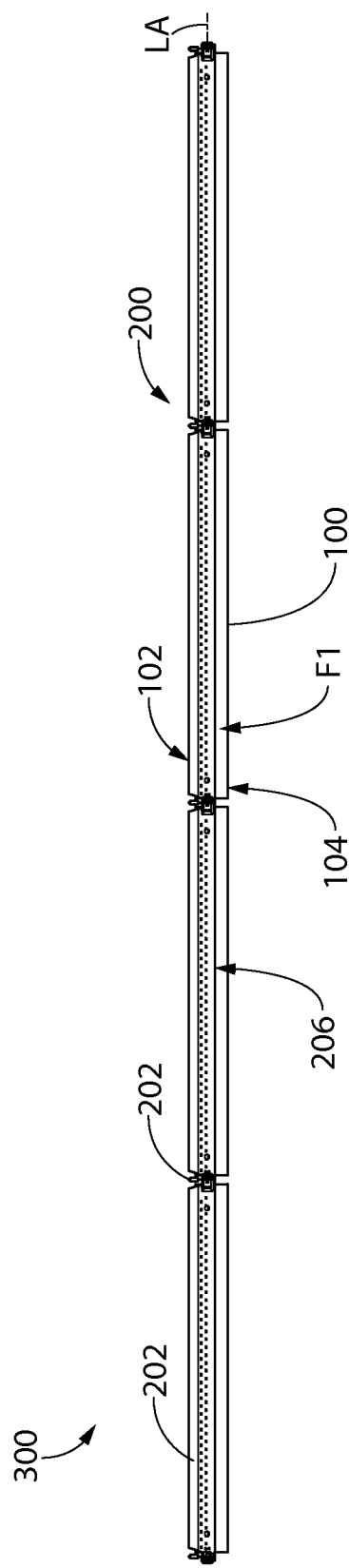
FIG. 15 is a second side elevation view of the ceiling system of FIG. 13, the view taken from a second orthogonal direction.
Figure 19:
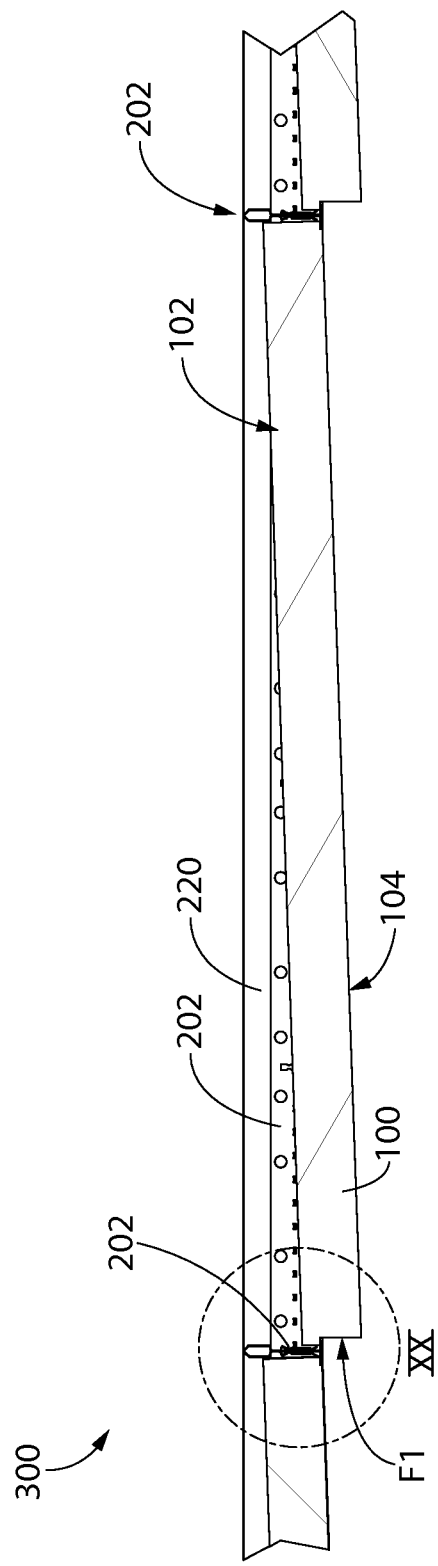
FIG. 19 is an enlarged detail XIX taken from FIG. 18.

When full mounted to the grid support members 202, the ceiling tiles 100 which have a substantially uniform thickness T1 in this embodiment are slanted or angled in orientation with respect to the support members, and more particularly to horizontal reference plane P1 defined by the bottom surface of the support members. As shown in FIGS. 14, 19, and 20, the top surface 102 of the ceiling tile 100 slopes downward from peripheral side 106 having a shallow end recess 107 to peripheral side 108 having a deeper end recess 109. Accordingly, top surface 102 is disposed at an angle A4 (indicated in FIG. 14) formed between horizontal reference plane P1 and the top surface. Concomitantly, the bottom surface 104 slopes downward from peripheral side 106 to peripheral side 108. Bottom surface 104 is disposed at an angle A5 (indicated in FIG. 14) formed between horizontal reference plane P1 and the bottom surface. The bottom corner 120 on peripheral side 108 (see also FIG. 5) projects below the bottom surface 206 of grid support member 202 and horizontal reference plane P1 by vertical distance D1 which corresponds to the height of the end surface F1 reveal that is visible to a room occupant. Ceiling tile bottom corner 120 defines a second horizontal reference plane P2 which lies parallel to horizontal reference plane P1.

In the present embodiment, the bottom corner 122 on the opposing peripheral side 106 of ceiling tile 100 (see also FIG. 4) lies substantially on the horizontal reference plane P1 as shown in FIGS. 14 and 20. Accordingly, the bottom corner 122 and bottom surface 104 of the ceiling tile adjacent peripheral side 106 is substantially flush with the bottom surface 206 of the grid support members 202 so that the grid support members essentially visually disappears at this side of the ceiling tile. In other possible embodiments contemplated, the bottom end 122 may project slightly downward below the bottom surface 206 of grid support member 202 and horizontal reference plane P1 if desired for aesthetic reasons. It bears noting that top corner 121 on peripheral side 106 of ceiling tile 100 is located higher than opposing top corner 123 on side 108 when the ceiling tile is in the fully mounted position (with respect to horizontal reference plane P1) because of the angled or slanted mounting position of the tile.

If the embodiment of ceiling tile 100 shown in FIGS. 7-11 is used with sloping or angled back flanges 110b and 112b formed on tegular-edged peripheral sides 110 and 112, the angled downward facing offset support surfaces 110a and 112a would engage and rest on upward facing support surfaces 204 of the grid support members 202 (shown extending horizontally side-to-side in FIGS. 14 and 20). FIG. 14 identifies support surface 110a in dashed lines to represent this engagement. The engagement on opposite peripheral side 110 not visible in FIG. 14 would be identical.

If the embodiment of ceiling tile 100 shown in FIGS. 1-6 having straight peripheral sides 110 and 112 without angled or sloping tegular edges is used instead, the straight sides would not engage grid support members 202. Rather, the straight peripheral sides 110, 112 would simply pass alongside the horizontal bottom flange 210 of and through the grid support member 202.

Referring to FIGS. 13-20, a method of mounting the ceiling tiles 100 in overhead support grid 200 may include holding a ceiling tile in a tilted or angled position (to horizontal) and then inserting one of peripheral sides 106 or 108 upwards into a grid support member 202 through a grid opening 208 from below the support grid 200. Assuming for example without limitation that side 106 is inserted first, for convenience of description, peripheral side 106 is higher than peripheral side 108 which would be positioned below the support grid 200 and opening 208. Back flange 106b on peripheral side 106 of ceiling tile 100 may then be positioned and located above horizontal bottom flange 210 and over an upward facing support surface 204 on the bottom flange. The peripheral side 106 may then be lowered to engage downward facing support surface 106a of the ceiling tile with support surface 204 on the bottom flange 210 of grid support member 202. The ceiling tile 100 may still be in a generally tilted or angled position with peripheral side 106 being higher than peripheral side 108 which may still be positioned below the support grid 200 and opening 208.

The remaining peripheral side 108 is then rotated upwards (clockwise for example in FIGS. 19 and 20) so that back flange 108b moves upwards through grid opening 208 to a position just slightly higher than bottom flange 210 of grid support member 202. Preferably, the offset horizontal distances H2 and H12 on peripheral sides 106, 108 respectively (see FIGS. 4 and 5) are large enough to provide adequate lateral play for inserting one side 106 and then the remaining side 108 through the grid opening 208 between two grid support members 202. Back flange 108b on peripheral side 108 of ceiling tile 100 may then be positioned and located above horizontal bottom flange 210 and over an upward facing support surface 204 on the bottom flange of grid support member 202. The peripheral side 108 may then be lowered to engage downward facing support surface 108a of the ceiling tile with support surface 204 on the bottom flange 210 of the grid support member 202. The ceiling tile 100 is now fully mounted at the perimeter to the overhead support grid 200.

It will be appreciated that if peripheral side 108 was inserted first into the support grid 200 in lieu of peripheral side 106 during the ceiling tile mounting procedure, the foregoing installation sequence would simply be reversed.

By varying the horizontal orientation of ceiling tile 100 in grid openings 208, numerous customizable ornamental ceiling configurations may be created by selecting various combinations of positions for the end surface F1 reveal on peripheral side 108.

FIGS. 21A-B show one exemplary pattern producing a shingled visual effect. The end surface F1 reveals on peripheral sides 108 are positioned parallel to each other and at opposing ends of adjacent grid openings 208 (the arrows pointing to the location of end surface F1 reveals on each ceiling tile 100). The ceiling tiles 100 have a square shape in top plan view in this embodiment.

FIGS. 22A-B show another exemplary pattern producing a pinwheel visual effect. The end surface F1 reveals on peripheral sides 108 are positioned at right angles to each other in adjacent grid openings 208 (the arrows pointing to the location of end surface F1 reveals on each ceiling tile 100). The ceiling tiles 100 have a square shape in top plan view in this embodiment.

Figure 23A:
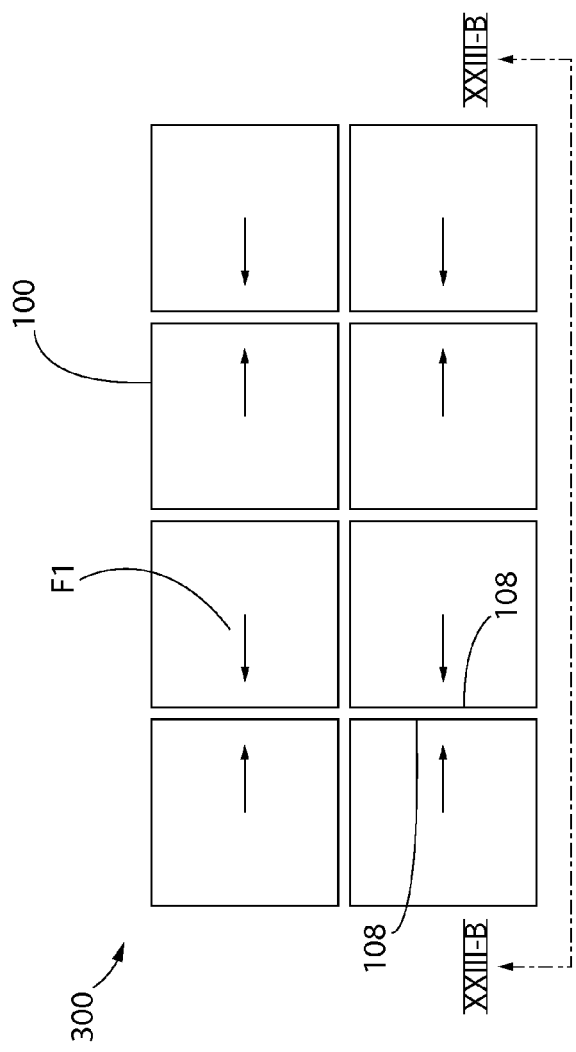
Figure 23B:
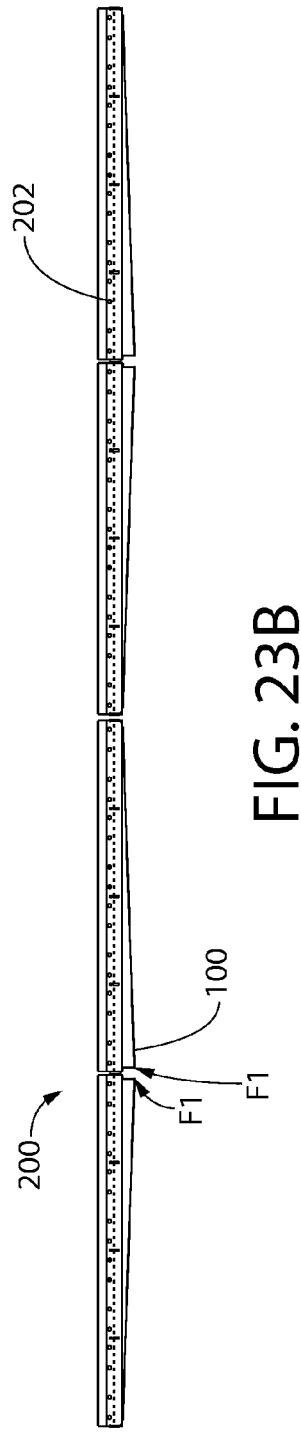

FIGS. 23A-B show another exemplary pattern producing a faceted hill and valley visual effect. The end surface F1 reveals on peripheral sides 108 are positioned parallel to each other and at adjoining ends of adjacent grid openings 208 (the arrows pointing to the location of end surface F1 reveals on each ceiling tile 100). The ceiling tiles 100 have a square shape in top plan view in this embodiment.

FIGS. 24A-B show one exemplary pattern producing a shingled visual effect using ceiling tiles 100 having a rectangular or plank shape in top plan view in this embodiment. It will be appreciated that the rectangular ceiling tiles 10 may also be arranged in the foregoing pinwheel or hill and valley patterns. The end surface F1 reveals on peripheral sides 108 are positioned at opposing ends of adjacent grid openings 208 (the arrows pointing to the location of end surface F1 reveals on each ceiling tile 100).

It will be appreciated that various combinations of the foregoing patterns or a multitude of other patterns may be used in a single ceiling system 300 advantageously providing a highly customizable appearance. Accordingly, the foregoing patterns are intended to provide only some illustrative, but non-limiting examples of the types of patterns that may be created.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A ceiling system comprising:
an overhead support grid defining a grid opening configured for locating a ceiling tile therein; and
a ceiling tile positioned in the grid opening and having a top surface and a bottom surface, the ceiling tile having a first tegular edge engaging the support grid and an opposing second tegular edge engaging the support grid, the first tegular edge having a configuration different than the second tegular edge;
wherein the ceiling tile has a substantially uniform thickness between the first and second tegular edges, and the top surface and bottom surface of the ceiling tile is angled with respect to the support grid when mounted therein.

2. The ceiling system of claim 1, wherein the first tegular edge has a deep recess and the second tegular edge has a shallow recess, the first tegular edge sitting lower in the support grid than the second tegular edge, and wherein the ceiling tile is seated in an angled position when mounted in the support grid.

3. The ceiling system of claim 1, wherein the bottom surface of the ceiling tile is angled with respect to the support grid when mounted therein, the bottom surface being substantially parallel to the top surface of the ceiling tile.

4. The ceiling system of claim 1, wherein the first tegular edge includes an end surface defining an exposed reveal that is visible below the support grid and the bottom surface of the ceiling tile is substantially flush with the bottom surface of the support grid at the second tegular edge.

5. The ceiling system of claim 1, wherein the first tegular edge includes an end surface defining an exposed reveal that is visible below the support grid and a top of the end surface of the first tegular edge is angled inwards towards a center of the tile.

6. The ceiling system of claim 1, wherein the first tegular edge includes an end surface defining an exposed reveal that is visible below the support grid and the end surface of the first tegular edge is not perpendicular to the top surface of the ceiling tile; and wherein the end surface of the first tegular edge is between 0 and 45 degrees to a vertical reference line perpendicular to the top surface of the ceiling tile.

7. The ceiling system of claim 1, wherein:
the first tegular edge defines a downward facing first support surface engaging an upward facing support surface formed on the support grid, and the opposing second tegular edge defines a downward facing second support surface engaging an upward facing support surface formed on the support grid, the first support surface being located at a greater vertical distance from the bottom surface of the ceiling tile than the second support surface such that the ceiling tile is angled with respect to the support grid when mounted therein.

8. The ceiling system of claim 1, further comprising a third angled tegular edge and an opposing fourth angled tegular edge both disposed at a 90 degree angle on the ceiling tile to the first and second tegular edges, wherein the third angle tegular edge defines a downward facing third support surface engaging an upward facing support surface formed on the support grid, and the opposing fourth tegular edge defines a downward facing fourth support surface engaging an upward facing support surface formed on the support grid, wherein the third and fourth support surfaces are disposed at an angle to the bottom surface of the ceiling tile between 0 and 45 degrees.

9. The ceiling system of claim 1, further comprising a third straight edge and an opposing fourth straight edge both disposed at a 90 degree angle on the ceiling tile to the first and second tegular edges, the straight and tegular edges defining four peripheral sides of the ceiling tile.

10. A ceiling system comprising:

an overhead support grid comprising intersecting grid support members defining a grid opening configured for locating a ceiling tile therein; and a ceiling tile positioned in the grid opening, the ceiling tile having a top surface and a bottom surface oriented parallel to the top surface;

the ceiling tile having a tegular first peripheral side defining a downward facing first support surface engaging one of the grid support members and an opposing tegular second peripheral side defining a downward facing second support surface engaging a second grid support members;

wherein the first and second support surfaces are configured so that the ceiling tile is angled in orientation with respect to a horizontal reference plane defined by the grid support members when the ceiling tile is mounted in the support grid; and wherein the first peripheral side defines an outward facing end surface extending downwards below the grid support members and defining an exposed reveal that is visible below the support grid, and wherein the bottom surface of the ceiling tile is substantially flush with the bottom surface of the support grid at the second peripheral side and located higher than the bottom surface at the first peripheral side;

wherein the ceiling tile has a thickness measured between the top and bottom surfaces at the first peripheral side which is substantially the same as a thickness at the second peripheral side.

11. The ceiling system of claim 10, wherein the ceiling tile has a substantially uniform thickness between the first and second peripheral sides.

12. The ceiling system of claim 10, wherein the grid support members include a bottom flange that defines upward facing support surfaces which engage the downward facing first and second support surfaces of the ceiling tile; and wherein each grid support member includes a vertical web extending upwards from the bottom flange.

13. The ceiling system of claim 10, wherein a top of the end surface of the first peripheral side is angled inwards towards a center of the tile.

14. The ceiling system of claim 10, wherein the end surface of the first peripheral side is not perpendicular to the top surface of the ceiling tile.

15. The ceiling system of claim 10, wherein the end surface of the first peripheral side is oriented substantially perpendicular to a bottom surface of the grid support members.

16. The ceiling system of claim 10, wherein the first support surface is located at a greater vertical distance from the bottom surface of the ceiling tile than the second support surface to produce the angled orientation.

17. The ceiling system of claim 10, wherein the first peripheral side is configured with a tegular edge and the second peripheral side is configured with a tegular edge.

18. The ceiling system of claim 17, wherein the second peripheral side has a straight edge.

19. The ceiling system of claim 10, further comprising a third peripheral side having an angled tegular edge and an opposing fourth peripheral side having an angled tegular edge both disposed at a 90 degree angle on the ceiling tile to the first and second peripheral sides, wherein the third angle tegular edge defines a downward facing third support surface engaging an upward facing support surface formed on the support grid, and the opposing fourth tegular edge defines a downward facing fourth support surface engaging an upward facing support surface formed on the support grid, wherein the third and fourth support surfaces are disposed at an angle to the bottom surface of the ceiling tile between 0 and 45 degrees.

20. The ceiling system of claim 10, further comprising a third straight edge and an opposing fourth straight edge both disposed at a 90 degree angle on the ceiling tile to the first and second tegular edges, the straight and tegular edges defining four peripheral sides of the ceiling tile.

* * * * *